Figure 1:
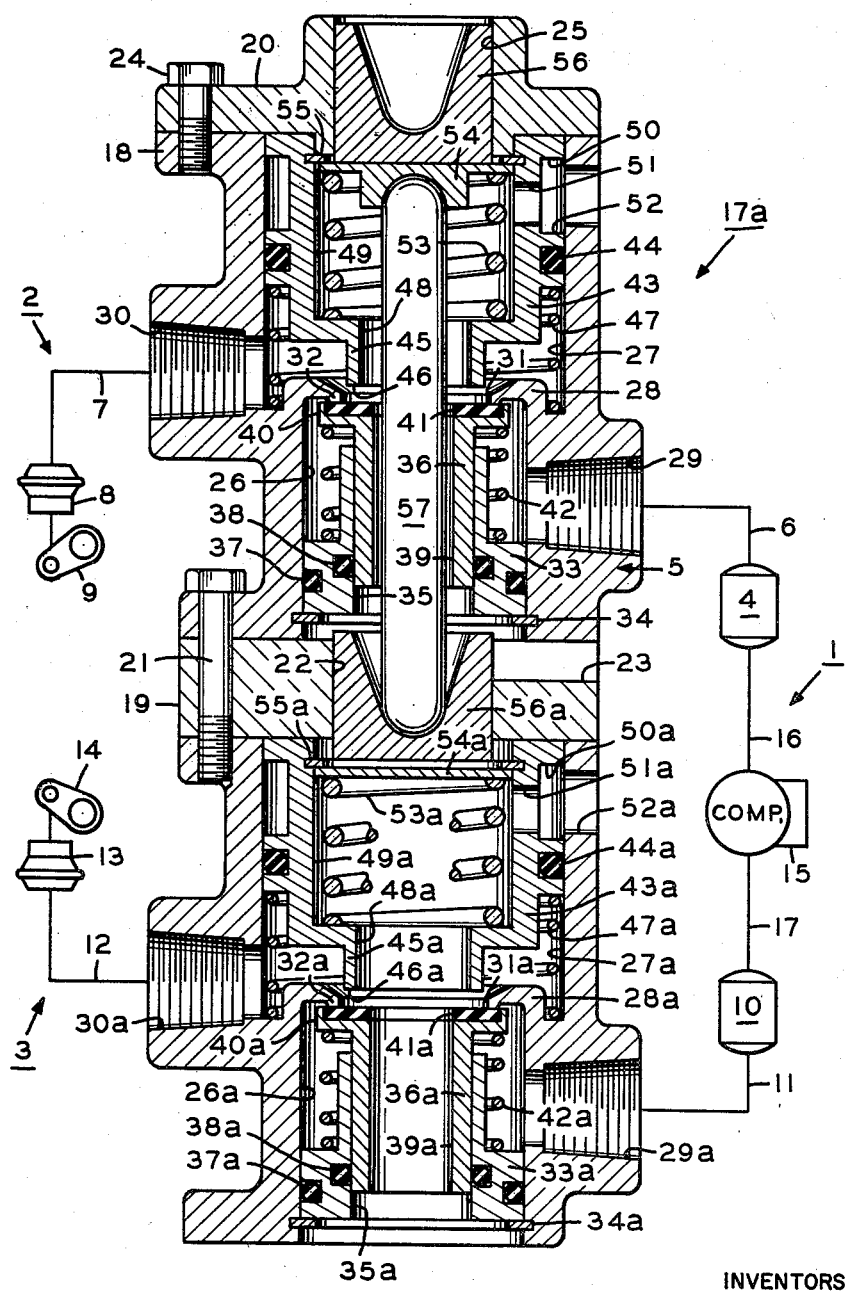

INVENTORS
RICHARD C. BUELER
RAYMOND F. STELZER

United States Patent Office 3,169,804
Patented Feb. 16, 1965

3,169,804
CONTROL VALVE
Richard C. Bueler, Glendale, and Raymond F. Stelzer, Berkeley, Mo., assignors to Wagner Electric Corporation, St. Louis, Mo., a corporation of Delaware
Filed Apr. 23, 1963, Ser. No. 274,983
1 Claim. (Cl. 303—52)

This invention relates to control valves and in particular to tandem type control valves which control separate fluid pressure systems.

In the past, tandem control valves were provided with separate valve means therein for controlling pressure fluid flow in separate systems, and said separate valve means were actuated by separate valve control or actuation members which were interconnected by yoke-type linkage, or the like, with an operator pedal or treadle. One of the undesirable features of the past tandem control valves was that separate reaction forces, which provide "feel" as to the extent of the braking effort, were established on each of the valve control members for transmission to the operator treadle through the yoke-type linkage. Another undesirable feature was that an appreciable lost stroke in the operator treadle accompanied the failure of fluid pressure in one of the separate systems. Still another undesirable feature was the requirement of an intermediate yoke-type connecting linkage between the separate valve control members and the operator treadle.

It is the object of the present invention to provide a control valve to overcome the aforementioned undesirable and objectional features, and this and other objects and advantages will become apparent hereinafter.

Briefly, the invention is embodied in a control valve having separate pairs of pressure fluid flow passage means therein respectively connected between a pair of separate fluid pressure sources and a pair of servo motors, and a pair of valve means are controllably positioned in said flow passage means by a pair of valve control members to control the application of fluid pressure through said flow passage means.

This invention also consists in the parts and combination of parts hereinafter described and claimed. In the accompanying drawing which forms a part of the specification and wherein like numerals refer to like parts wherever they occur:

FIG. 1 is a diagrammatic view of a fluid pressure system showing a control valve embodying the present invention therein in cross-section.

Referring now to FIG. 1, a dual brake actuating system 1 is shown having separate fluid pressure branches 2 and 3. The branch 2 includes a reservoir 4 for fluid pressure storage which is connected to one of a pair of separate inlet ports of a treadle actuated tandem control valve 5 by a conduit 6. The tandem control valve 5 is also provided with a pair of separate outlet ports, and a service line or conduit 7 connects one of said outlet ports with a brake chamber 8 which is operatively linked with a slack adjuster 9 to control the energization of a vehicle wheel brake assembly (not shown). The branch 3 includes a reservoir 10 for fluid pressure storage which is connected to the other inlet port of the tandem control valve 5 by conduit 11, and another service line or conduit 12 connects the other of the outlet ports of said control valve with another brake chamber 13 which is operatively linked with another slack adjuster 14 to control the energization of another vehicle wheel brake assembly (not shown). To complete the system 1, a compressor 15 is connected to the reservoirs 4 and 10 by conduits 16 and 17, said compressor and separate reservoirs forming, in combination, separate fluid pressure sources.

The tandem control valve 5 is provided wtih a composite housing, indicated generally at 17a, which includes a pair of similar housings or housing portions 18, 18a, a connection plate 19 and a closure member 20. The housing portions 18, 18a have their lower and upper ends respectively secured with the connection plate 19 by suitable means, such as a plurality of bolts 21. The connection plate 19 is provided with an axial bore 22 which extends therethrough, and a radially extending groove or cross-passage 23 is provided in the upper surface of said connection plate between said connection plate bore and the outer marginal edge of said connection plate. The closure member 20 is connected with the upper end of the housing 18 by suitable means, such as a plurality of bolts 24, and said closure member is provided with an axial bore 25 which extends therethrough.

The housings 18, 18a are provided with axially aligned bores 26, 26a and counterbores 27, 27a which define radially extending housing walls 28, 28a therebetween, said bores 26, 26a forming inlet chambers and said counterbores 27, 27a forming outlet chambers. Inlet ports 29, 29a are provided in the housings 18, 18a connecting with the bores 26, 26a and respectively receive conduits 6 and 11, as previously mentioned. Outlet ports 30, 30a are provided in the housings 18, 18a connecting with the counterbores 27, 27a and respectively receive conduits 7 and 12, as previously mentioned. Connecting passages 31, 31a are axially provided through the housing walls 28, 28a between the bores 26, 26a and counterbores 27, 27a, and valve seats 32, 32a are provided on said walls 28, 28a facing the bores 26, 26a and in circumscribing relation with said connecting passages 31, 31a.

Valve guide members 33, 33a are received in the lower end of the bores 26, 26a and are normally positioned in abutment with snap ring and groove assemblies 34, 34a provided adjacent the lower end of said bores. The valve guide members 33, 33a are provided with bores 35, 35a in which inlet valve elements 36, 36a are slidable and seals 37, 37a and 38, 38a are carried by said valve guide members in sealing engagement with the housing bores 26, 26a and valve elements 36, 36a, respectively. The valve elements 36, 36a are provided with axial exhaust passages or openings 39, 39a therein, and the counterbores 27, 27a are vented to atmosphere through said exhaust passages. The exhaust passage 39 is connected with the atmosphere through the valve guide bore 35, the lower end of the housing bore 26 and the cross-passage 23 in the connection plate 19, and the exhaust passage 39a is connected with the atmosphere through the valve guide bore 35a and the lower end of the housing bore 26a. Enlarged sealing heads 40, 40a are provided on the valve elements 36, 36a and include annular seals or discs 41, 41a, and valve springs 42, 42a are biased between the valve guide members 33, 33a and the sealing heads 40, 40a. The compressive forces of the valve springs 42, 42a urge the valve guide members 33, 33a into abutting engagement with the snap ring and groove assemblies 34, 34a, as previously mentioned, and normally urge the valve seals 41, 41a of the valve element sealing heads 40, 40a into sealing engagement with the valve seats 32, 32a on the housing walls 28, 28a to interrupt pressure fluid communication between the bores 26, 26a and counterbores 27, 27a, respectively.

Reaction pistons or valve control members 43, 43a, are slidably received in the counterbores 27, 27a and seals 44, 44a are carried by said reaction pistons in sealing engagement with said counterbores. The pistons 43, 43a are provided with integral extensions 45, 45a which are coaxial with the counterbores 27, 27a and connecting passages 31, 31a, and valve seats 46, 46a are provided on the free end of said extensions. The valve seats 46, 46a are normally maintained in predetermined spaced relation with the valve seals 41, 41a of the valve elements 36, 36a by return springs 47, 47a interposed between the pistons 43, 43a and the housing walls 28, 28a. Other exhaust passages or openings 48, 48a are provided in the piston extensions 45, 45a and extend coaxially through the valve seats 46, 46a. The exhaust passages 48, 48a connect with axially aligned bores 49, 49a also provided in the pistons 43, 43a. Peripheral grooves 50, 50a are provided in the pistons 43, 43a between the seals 44, 44a and the upper ends of said pistons, and said peripheral grooves are connected with the piston bores 49, 49a by a plurality of cross passages 51, 51a. Exhaust ports 52, 52a are provided in the housings 18, 18a adjacent the upper ends thereof, and said exhaust ports are in open pressure fluid communication with the piston peripheral grooves 50, 50a at all times. Precompressed metering springs 53, 53a are biased between the shoulders formed in the intersection of piston exhaust passages 48, 48a and bores 49, 49a and force receiving plates 54, 54a which are slidable in said piston bores, said force receiving plate being retained therein against the compressive force of said metering springs by snap ring and groove assemblies 55, 55a provided adjacent the upper end of said piston counterbores. Force transmitting members or pistons 56, 56a are slidably positioned in the closure member bore 25 and the connecting plate bore 22, respectively, in abutting engagement with the force receiving plates 54, 54a of the pistons 43, 43a, and a connecting link 57 is provided in abutting engagement between the connecting plate 54 and the piston 56, said connecting link extending coaxially through the bore 49 and exhaust passage 48 of the piston 43, the connecting passage 31, the exhaust passage 39 of the valve element 36, and the lower end of the housing bore 26.

In the operation of the above described control valve 5 in the system 1, a manually applied force on the piston 56 by the operator is transmitted from the plate 54 through the metering spring 53 to the piston 43 and from the plate 54 through the connecting link 57 to the piston 56a and therefrom via the plate 54a and metering spring 53a to the piston 43a. This applied force initially moves the pistons 43, 43a downwardly in concert movement in the outlet chambers 27, 27a against the compressive force of the return springs 47, 47a. This concert downward movement initially engages the extension valve seats 46, 46a on the pistons 43, 43a with the valve elements 36, 36a to close the exhaust passages 39, 39a of said valve elements and also the exhaust passages 48, 48a of said pistons thereby isolating the outlet chambers 27, 27a from the atmosphere. Further concert downward movement of the pistons 43, 43a serves to disengage the valve elements 36, 36a from the valve seats 32, 32a on the housing walls 28, 28a against the compressive force of the valve springs 42, 42a to establish pressure fluid communication between the inlet and outlet chambers 26, 26a and 27, 27a, respectively. In this manner, pressure fluid flows from the reservoir 4 through the conduit 6, the inlet port 29, the inlet chamber 26, the connecting passage 31, the outlet chamber 27, the outlet port 30, and the service line 7 to actuate the brake chamber 8 which, in turn, rotates the slack adjuster 9 to energize the wheel brake assembly associated therewith. At the same time, pressure fluid also flows from the reservoir 10 through the conduit 11, the inlet port 29a, the inlet chamber 26a, the connecting passage 31a, the outlet chambers 27a, the outlet port 30a, and the service line 12 to actuate the brake chamber 13 which, in turn, rotates the slack adjuster 14 to energize the wheel brake assembly associated therewith. It should be noted that the reaction forces created by the fluid pressure so established in the outlet chambers 27, 27a and acting on the effective areas of the pistons 43, 43a are substantially equal and are additive in opposition to the applied force. In other words, the reaction force on the piston 43 is transmitted through the metering spring 53 to the plate 54 and piston 56 in direct opposition to the applied force, and the reaction force on the piston 43a is transmitted through the metering spring 53a, the plate 54a, the piston 56a and the connecting link 57 to the plate 54 and piston 56 in direct opposition to the applied force. When the reaction forces equal the manually applied force, the pistons 43, 43a are moved upwardly in concert movement against their metering springs 53, 53a so that the valve elements 36, 36a are concertly moved into lapped engagement with the seats 32, 32a on the housing walls 28, 28a by the valve springs 42, 42a and the piston valve seats 46, 46a are positioned in lapped engagement with the valve elements 36, 36a. Since reaction forces acting through the metering springs 53, 53a against the manually applied force are substantially equal and opposite thereto, the operator is afforded an accurate and direct "feel" as to the extent of the braking effort or application. If greater braking effort is desired, the manually applied force is increased which results in increased reaction forces, and the control valve 5 functions in the same manner as previously described to again move the component parts thereof to their lapped positions.

When the desired braking effort is attained, the manually applied force is removed from the piston 56, and the reaction forces on the pistons 43, 43a and the compressive forces of the return springs 47, 47a move the pistons 43, 43a upwardly toward their original positions in the housings 18, 18a while the metering springs 53, 53a return the plates 54, 54a to their original positions. This upward movement of the pistons 43, 43a disengages the piston valve seats 46, 46a from the valve elements 36, 36a to open exhaust passages 39, 39a and 48, 48a and reestablish communication between the outlet chambers 27, 27a and the atmosphere. In this manner, the wheel brake assembly associated with the brake chamber 8 is de-energized and the reaction force on the piston 43 is eliminated by exhausting fluid pressure from the brake chamber 8 through the service line 7, the outlet port 30, the outlet chamber 27, the exhaust passage 48, the piston bore 49, and the piston cross passage and peripheral groove 51 and 50 to the exhaust port 52 in the housing 18. It should be noted that the fluid pressure may also be exhausted from the outlet chamber 27 through the exhaust opening 39 in the valve element 36, the lower end of the housing bore 26 and the cross-passage 22 in the connecting plate 19. At the same time, the wheel brake assembly associated with the brake chamber 13 is also de-energized and the reaction force acting on the piston 43a is also eliminated by exhausting pressure fluid from said brake chamber through the service line 12, the outlet port 30a, the outlet chamber 27a, the exhaust passage 48a in the piston 43a, the piston bore 49a, and the piston cross-passage and peripheral groove 51a and 50a to the exhaust port 52a in the housing 18a. It should be noted that the fluid pressure may also be exhausted from the outlet chamber 27a through the exhaust opening 39a in the valve element 36a to the atmosphere through the lower end of the housing bore 26a.

In the event of failure of either of the branches 2 or 3 with a resultant loss of fluid pressure in either of the reservoirs 4 or 10, the manually applied force moves the pistons 43, 43a to actuate the valve elements 36, 36a as previously described. Since it is assumed that one of the branches 2 or 3 has failed, the establishment of fluid pressure in said one branch that failed is, of course, obviated; however, pressure fluid flow is established in the other of said branches to actuate the brake chamber associated therewith. The fluid pressure so established acts on the effective area of either the piston 43 or the piston 43a to create a reaction force in opposition to the applied force. It should be noted that there is no lost motion or increased pedal stroke when one of the branches 2 or 3 fails; however, the reaction force transmitted in opposition to the applied force is approximately one-half of that transmitted during normal operation of the control valve 5.

It is now apparent that a novel control valve and system therefor meeting the objects set out hereinbefore are provided and that changes or modifications to the precise configurations, shapes or details of the constructions set forth in the disclosure by way of illustration may be made by those skilled in the art without departing from the spirit of the invention as defined by the claim which follows.

What we claim is:

A control valve comprising a housing having a pair of sets of ports therein, each port set including inlet, outlet and exhaust ports, a pair of valve means in said housing normally interrupting pressure fluid communication between the inlet and outlet ports of said port sets, a pair of exhaust openings in said valve means normally establishing pressure fluid communication between the outlet and exhaust ports of said port sets, respectively, a pair of valve control members adapted for concert and independent movement in said housing, a pair of precompressed resilient metering means contained in said valve control members and respectively including force receiving members movable in said valve control members, operator controlled means engaged with one of said force receiving members of one of said resilient metering means for applying an actuating force thereto, said one force receiving member and resilient metering means being movable in response to the actuating force on said one force receiving member by said operator controlled means to concertly move one of said valve control members into engagement with one of said valve means to initially close the exhaust opening therein and thereafter move said one valve means to a position establishing pressure fluid communication between the inlet and outlet ports of one of said port sets, the established fluid pressure at the outlet port of said one port set acting on the effective area of said one valve control member to create a reaction force for moving said one valve control member against said one force receiving member and resilient metering means and transmitting said reaction force therethrough in opposition to the actuating force applied by controlled means, and rigid force transmitting means having an imperforate mid-portion extending substantially coaxially through the exhaust opening of said one valve means and being radially spaced therefrom and opposed free end portions in abutting engagement between said force receiving members for transmitting the applied actuating force on said one force receiving member to the other of said force receiving members and resilient metering means to effect applied force movement of said other valve control member substantially in concert with that of said one valve control member into engagement with the other of said valve means to initially close the exhaust opening therein and thereafter move said other valve means to a position establishing pressure fluid communication between the inlet and outlet ports of the other of said port sets in a time sequence substantially simultaneously with that established between the inlet and outlet ports of said one port set, the established fluid pressure at the outlet port of said other port set acting on the effective area of said other valve control member to create another reaction force for moving said other valve control member independently of said one valve control member against said other force receiving member and resilient metering means, and said rigid member serving to transmit said other reaction force directly to said one force receiving member to supplement said first named reaction force in opposition to the actuating force applied thereon by said operator controlled means.

References Cited in the file of this patent

UNITED STATES PATENTS 3,003,825    Kemble _____ Oct. 10, 1961

FOREIGN PATENTS 1,052,837    Germany _____ Mar. 12, 1959
92,118    Netherlands _____ Sept. 15, 1959